UNITED STATES PATENT OFFICE.

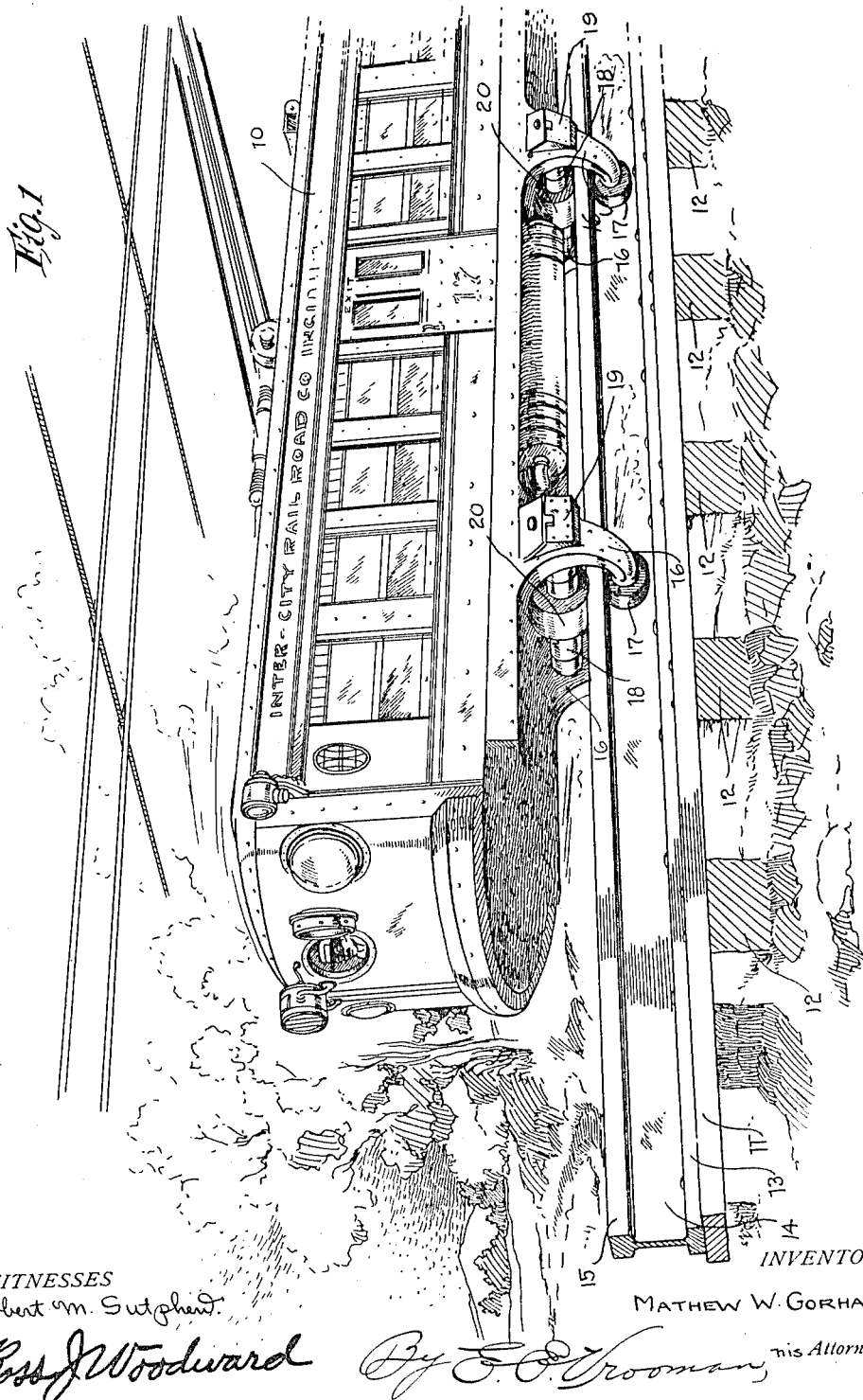

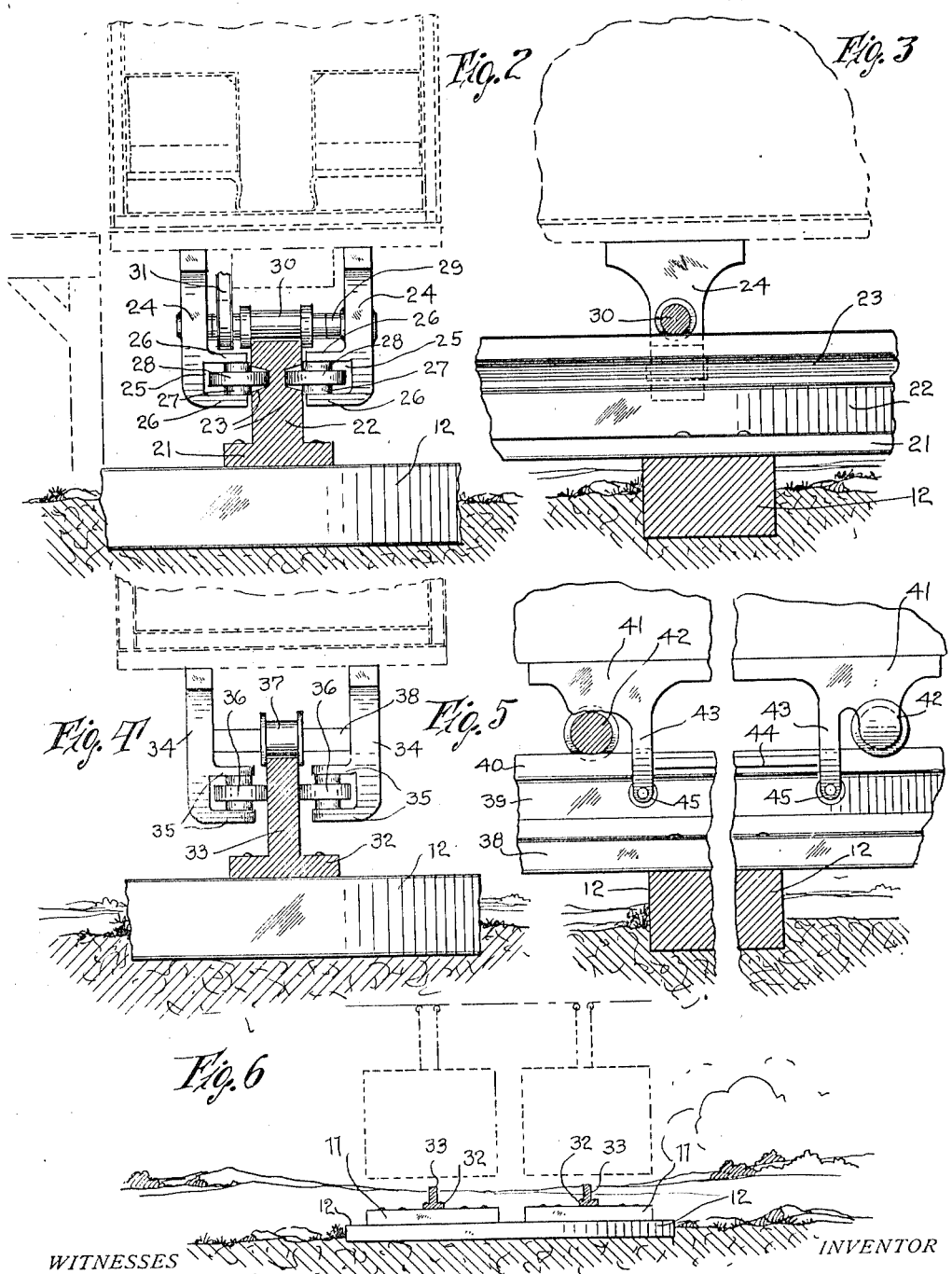

MATHEW W. GORHAM, OF WINNFIELD, LOUISIANA.

SINGLE-TRACK STREET-CAR.

1,064,141.  Specification of Letters Patent. Patented June 10, 1913.

Application filed June 24, 1912. Serial No. 705,593.

*To all whom it may concern:*

Be it known that I, MATHEW W. GORHAM, citizen of the United States, residing at Winnfield, in the parish of Winn and State of Louisiana, have invented certain new and useful Improvements in Single-Track Street-Cars, of which the following is a specification, reference being had therein to the accompanying drawing.

This invention relates to track and car construction, and the principal object of the invention is to provide a car which travels upon a single track.

Another object of this invention is to provide an improved type of track of this character which is strongly made and at the same time may be cheaply manufactured.

Another object of this invention is to provide an improved type of truck construction for the car so that the car may move upon this single track.

Another object of this invention is to so construct this truck that the car will be prevented from coming off of the track so that there is no danger of an accident from the car jumping the track.

This invention comprises a construction which is susceptible to a number of changes in detail, a number of different ways of forming the track and car truck construction being shown in the accompanying drawings, wherein:—

Figure 1 is a view showing a car mounted upon a single track and provided with one type of truck construction. Fig. 2 is an end elevation of the car truck with the rail shown in section and the car indicated by dotted lines. Fig. 3 is a view showing the rail in side elevation and the car truck in vertical section. Fig. 4 is a view similar to Fig. 2 but showing a modified form of track and car truck. Fig. 5 is a view similar to Fig. 3 of still another modified form of track and car truck. Fig. 6 is a view showing the manner of laying the tracks, the cars being indicated by dotted lines.

Referring to the accompanying drawings, it will be seen that this device comprises a car 10 which runs upon a single track which is mounted upon a longitudinally extending base 11 carried by the ties 12. The rail may be formed as shown in Fig. 1, or may be formed as shown in Figs. 2 and 4, according to the type of car truck it is desired to use.

In Fig. 1 there has been shown the rail having the base 13, web 14, and tread 15. This rail is very similar to the rails which are used in the ordinary track construction and these rails could be used when this type of rail is necessary. The car truck carries the curved arms 16 which extend down beneath the sides of the tread 15 and carry rollers 17 which fit against the under faces of the tread to each side of the web 14, thus preventing the car from jumping the track. It is, of course, obvious that since these rollers will rotate very readily that they permit the car to move along the track very rapidly and in no way hinder the free movement of the car. It will also be obvious that at the curves in the track it will be necessary to make the web of the track rather narrow so that the required amount of side play will be permitted in order to turn the curve and also, if desired, the car will be provided with the usual type of trucks which are pivotally mounted in order to permit the car to have the required amount of independent movement from the wheels in order to turn the curves. In the drawing the truck has been shown formed solid with the car, but if this car were used upon tracks having sharp turns along its route, the provision of pivotally mounted trucks carrying the arms 16 could be readily made without departing from the spirit of this invention. A shaft 18 is mounted between the arms 16 and has its ends mounted in the journal boxes 19 carried by the arms 16. A roller 20 is carried by the shaft 18 and rests upon the tread 15 of the track so that the car may be propelled along the track when the shaft 18 is rotated by the usual motor carried by the car.

In Figs. 2 and 3, there has been shown a modified form of track and truck in which the rail is provided with the base 21 and thick web 22 which is provided with the longitudinally extending grooves 23 formed adjacent the top to provide the grooves in which the side rollers carried by the truck are adapted to fit. The truck is provided with the side arms 24 having the angularly disposed lower end portions provided with the grooves 25 forming the spaced fingers 26. Rollers 27 are mounted between the fingers 26 and fit against the sides of the web 22. The central portion 28 of each of the rollers 27 is thickened and fits into one of the grooves 23 so that the rollers 27 engage the web to each side of the grooves 23 also bearing against the inner walls of the grooves. A shaft 29 is rotatably mounted between the arms 24 and carries the grooved roller 30 which fits upon the top of the rail. A pulley wheel is mounted upon the shaft 29 and a belt 31 leads from the pulley wheel to the motor carried by the car so that the shaft may be rotated thus propelling the car along the track.

In Fig. 4 there has been shown still another modification of this invention in which the rail is provided with the base 32 and the web 33 which is unbroken throughout its height. The truck is provided with the arms 34 similar to the arms 24, the arms being provided at their lower ends with the angularly disposed fingers 35 between which the rollers 36 are mounted. These rollers 36 are similar to the rollers 27 and are provided with the thickened central portion which bears against the sides of the rail. The grooved roller 37 is mounted upon the upper edge of the rail with its flanges extending along the sides of the rail to assist in keeping the car upon the track, and is mounted upon the shaft 38 which is rotatably mounted between the arms 34.

In Fig. 5 the rail is formed very similar to that shown in Fig. 1 and is provided with the base 38, the web 39, and the tread 40. The truck is provided with the end side arms 41 which carry the rollers 42 resting upon the tread of the rail and provided with the side flanges extending along the sides of the tread. Intermediate arms 43 are carried by the truck and extend from the arms 41 and are braced by the connecting bars 44. Rollers 45 are carried by the arms 43 and fit beneath the sides of the tread 40 to prevent the car from jumping the track. It is, of course, obvious that in this form as well as in the other forms, the motor power is connected with the rollers 42 so that the car will be propelled along the track.

From an inspection of Fig. 6, it will be seen that the ties 12 are laid upon the road bed and the supporting bars 11 mounted upon the ties 12 so that a solid bed is formed for the rails which are mounted upon these bars 11 after the car passes along one of the rails and it is, therefore, not necessary to provide the usual number of rails, thus causing a great saving in keeping up the track. The car is mounted upon the rail with the rollers resting upon the upper edge of the rail and bearing against the sides of the rail, so that any danger of the car jumping the rail is prevented.

Having thus described my invention, what I claim as new is:—

The combination of a rail provided with longitudinally extending grooves in the sides thereof, depending arms carried by the truck of a car, a supporting wheel rotatably mounted between said arms and resting upon the upper edge of said rail, and wheels rotatably connected with the ends of said arms and contacting with said rail above and below the groove formed therein, and provided with thickened center portions contacting with the inner walls of said grooves.

In testimony whereof I hereunto affix my signature in presence of two witnesses.

MATHEW W. GORHAM.

Witnesses:
 ROBERT L. SHIRLEY,
 JAMES T. DURHAM.